(12) United States Patent
Pan

(10) Patent No.: US 11,415,732 B2
(45) Date of Patent: Aug. 16, 2022

(54) QUANTUM DOT DISPLAY DEVICE AND MANUFACTURING METHOD THEREOF

(71) Applicant: Shenzhen China Star Optoelectronics Semiconductor Display Technology Co., Ltd., Shenzhen (CN)

(72) Inventor: Su Pan, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 180 days.

(21) Appl. No.: 16/759,336

(22) PCT Filed: Apr. 14, 2020

(86) PCT No.: PCT/CN2020/084691
§ 371 (c)(1),
(2) Date: Apr. 26, 2020

(87) PCT Pub. No.: WO2021/196277
PCT Pub. Date: Oct. 7, 2021

(65) Prior Publication Data
US 2022/0043193 A1 Feb. 10, 2022

(30) Foreign Application Priority Data
Mar. 30, 2020 (CN) .......................... 202010233891.0

(51) Int. Cl.
*G02B 5/20* (2006.01)
*G02B 26/00* (2006.01)

(52) U.S. Cl.
CPC .......... *G02B 5/207* (2013.01); *G02B 26/005* (2013.01); *G02B 2207/115* (2013.01)

(58) Field of Classification Search
CPC . G02B 5/207; G02B 26/005; G02B 2207/115
See application file for complete search history.

(56) References Cited

U.S. PATENT DOCUMENTS

| 9,140,893 B1 | 9/2015 | Zhao |
| 10,108,004 B1* | 10/2018 | Langendijk .......... G02B 26/005 |
| 2005/0128370 A1 | 6/2005 | Moon |
| 2007/0052660 A1 | 3/2007 | Montbach et al. |
| 2007/0075922 A1 | 4/2007 | Jessop |

(Continued)

FOREIGN PATENT DOCUMENTS

| CN | 1627467 | 6/2005 |
| CN | 101493576 | 7/2009 |

(Continued)

*Primary Examiner* — Kevin Quarterman

(57) ABSTRACT

The present invention provides a quantum dot display device and a manufacturing method thereof. The quantum dot display device includes a base substrate, a backlight, a color conversion layer disposed on a side of the backlight away from the base substrate, and an electro-fluidic shutter disposed on a side of the color conversion layer away from the backlight. The electro-fluidic shutter includes a plurality of shutter units, and a sealing portion is disposed between adjacent shutter units. Contrast of the quantum dot display device under strong ambient light is improved, which is beneficial for application in outdoor advertising displays and the like.

17 Claims, 4 Drawing Sheets

(56) References Cited

U.S. PATENT DOCUMENTS

| | | | |
|---|---|---|---|
| 2007/0188676 A1* | 8/2007 | Choi | G02B 3/14 |
| | | | 349/62 |
| 2009/0002806 A1 | 1/2009 | Skipor et al. | |
| 2009/0027751 A1* | 1/2009 | Chen | G09G 3/3433 |
| | | | 359/228 |
| 2009/0046231 A1* | 2/2009 | Lu | G02F 1/133377 |
| | | | 349/139 |
| 2009/0103159 A1* | 4/2009 | Cheng | G02B 26/005 |
| | | | 359/228 |
| 2009/0168144 A1* | 7/2009 | Lo | G02B 26/005 |
| | | | 359/290 |
| 2010/0033798 A1* | 2/2010 | Wang | G02B 26/005 |
| | | | 359/290 |
| 2011/0316764 A1 | 12/2011 | Parry-Jones et al. | |
| 2012/0019523 A1 | 1/2012 | Lee et al. | |
| 2012/0320445 A1* | 12/2012 | Yang | G02B 26/005 |
| | | | 359/290 |
| 2013/0038943 A1 | 2/2013 | Toko et al. | |
| 2013/0088469 A1 | 4/2013 | Yee | |
| 2013/0182410 A1 | 7/2013 | Gibson | |
| 2013/0208337 A1* | 8/2013 | Lee | G02B 26/005 |
| | | | 359/290 |
| 2018/0005589 A1 | 1/2018 | Manukyan et al. | |
| 2018/0011310 A1* | 1/2018 | Mao | G02B 26/005 |
| 2018/0067363 A1 | 3/2018 | Li et al. | |
| 2018/0151852 A1 | 5/2018 | Sakuishi et al. | |
| 2018/0157098 A1 | 6/2018 | Choung et al. | |
| 2019/0107765 A1* | 4/2019 | Whitehead | G02F 1/167 |
| 2020/0363575 A1 | 11/2020 | Baek et al. | |

FOREIGN PATENT DOCUMENTS

| | | |
|---|---|---|
| CN | 101650894 | 2/2010 |
| CN | 101968566 | 2/2011 |
| CN | 102346308 | 2/2012 |
| CN | 102928976 | 2/2013 |
| CN | 102981267 | 3/2013 |
| CN | 203012239 | 6/2013 |
| CN | 103955055 | 7/2014 |
| CN | 104882404 | 9/2015 |
| CN | 105589250 | 5/2016 |
| CN | 108152944 | 6/2018 |
| CN | 108153035 | 6/2018 |
| CN | 108153036 | 6/2018 |
| CN | 108181759 | 6/2018 |
| CN | 110928021 | 3/2020 |
| WO | WO 2009/002701 | 12/2008 |
| WO | WO 2011/162029 | 12/2011 |
| WO | WO 2012/044303 | 4/2012 |
| WO | WO 2012/165721 | 12/2012 |

* cited by examiner

QUANTUM DOT DISPLAY DEVICE AND MANUFACTURING METHOD THEREOF

RELATED APPLICATIONS

This application is a National Phase of PCT Patent Application No. PCT/CN2020/084691 having International filing date of Apr. 14, 2020, which claims the benefit of priority of Chinese Patent Application No. 202010233891.0 filed on Mar. 30, 2020. The contents of the above applications are all incorporated by reference as if fully set forth herein in their entirety.

FIELD AND BACKGROUND OF THE INVENTION

The present invention relates to the field of display devices, and in particular, to a quantum dot display device and a manufacturing method thereof.

Quantum dots are semiconductor particles with a diameter of nanometers, which will excite light having a specific wavelength under an electric field or light. By adjusting particle diameters of the quantum dots, the quantum dots can emit red light, green light, or blue light. The quantum dots have a narrow light-emitting spectrum and are characterized by high color saturation, and can be used as a light conversion layer on organic light emitting diodes (OLEDs) or micro LEDs to solve problems of low yield of full-color OLEDs and full-color difficulty of micro LEDs. However, display effect of this kind of quantum dot display will be affected by ambient light, because even in a dark state of the display, the ambient light will excite the quantum dots to emit light, thereby reducing contrast of the display.

Therefore, current technology needs to be improved.

SUMMARY OF THE INVENTION

In order to solve problems in the prior art, the present invention provides a quantum dot display device and a manufacturing method thereof.

The present invention provides a quantum dot display device. The quantum dot display device comprises:

a base substrate;

a backlight disposed on a side of the base substrate;

a color conversion layer disposed on a side of the backlight away from the base substrate; and an electro-fluidic shutter disposed on a side of the color conversion layer away from the backlight, wherein the electro-fluidic shutter comprises a plurality of shutter units, and a sealing portion is disposed between adjacent shutter units, each of the shutter units comprises a first substrate, a second substrate disposed opposite to the first substrate, a first electrode disposed on the first substrate, a second electrode disposed on the second substrate and opposite to the first electrode, a dielectric layer disposed on a side of the first electrode away from the first substrate, and a conductive fluid and a non-conductive fluid filled between the first substrate and the second substrate, wherein the conductive fluid and the non-conductive fluid are immiscible with each other, the conductive fluid has light transmittance, and the non-conductive fluid has light absorption.

In some embodiments, the conductive fluid is pure water or an aqueous solution with an electrolyte, and the non-conductive fluid is a black organic solution.

In some embodiments, the non-conductive fluid is black ink.

In some embodiments, the dielectric layer comprises a hydrophobic dielectric layer, the hydrophobic dielectric layer is disposed on the side of the first electrode away from the first substrate, the hydrophobic dielectric layer comprises a hydrophobic surface, and the hydrophobic surface is disposed on a side of the hydrophobic dielectric layer away from the first electrode.

In some embodiments, the dielectric layer further comprises a hydrophilic dielectric layer, the hydrophilic dielectric layer comprises a hydrophilic surface, the hydrophilic surface is disposed on a side of the hydrophilic dielectric layer away from the first electrode, and an area of the hydrophilic surface exposed in a same shutter unit is no more than 5% of an area of the hydrophobic surface.

In some embodiments, the dielectric layer further comprises a hydrophilic dielectric layer having a hydrophilic surface, the hydrophilic dielectric layer is disposed between the hydrophobic dielectric layer and the first electrode, a through hole is defined at an edge of the hydrophobic dielectric layer in the shutter unit, and the hydrophilic surface is exposed from the through hole.

In some embodiments, the dielectric layer further comprises a hydrophilic dielectric layer having a hydrophilic surface, the hydrophobic dielectric layer and the hydrophilic dielectric layer are on a same layer and are disposed on the side of the first electrode away from the first substrate, the hydrophilic dielectric layer is disposed close to a corner region of the sealing portion, and the hydrophobic surface and the hydrophilic surface together cover a side surface of the first electrode.

In some embodiments, the color conversion layer comprises a plurality of pixel units, and the shutter units and the pixel units are disposed corresponding to each other in a one-to-one manner.

In some embodiments, the backlight is a blue backlight, the pixel units comprise a red pixel unit, a green pixel unit, and a transparent pixel unit, the red pixel unit comprises red quantum dot material, the green pixel unit comprises green quantum dot material, and the shutter unit is disposed on a side of the red pixel unit and the green pixel unit away from the backlight.

The present invention further provides a manufacturing method of the quantum dot display device, comprising following steps: forming an electro-fluidic shutter, wherein steps of forming the electro-fluidic shutter comprise: providing a first substrate; forming a first electrode on the first substrate; forming a dielectric layer on the first electrode; forming a sealing portion on the dielectric layer to form a plurality of receiving portions; injecting a conductive fluid and a non-conductive fluid in each of the receiving portions; providing a second substrate and depositing a second electrode on the second substrate; sealing the receiving portions with the second substrate on which the second electrode is deposited; and providing a base substrate, wherein a backlight is disposed on the base substrate, a color conversion layer is formed on a side of the backlight away from the base substrate, and the electro-fluidic shutter is attached to a side of the color conversion layer away from the backlight.

In some embodiments, the color conversion layer comprises a plurality of pixel units, a bank portion is disposed between adjacent pixel units, and the bank portion and the sealing portion are disposed corresponding to each other.

Beneficial Effect

Compared with the prior art, an electro-fluidic shutter is formed on a display surface of a quantum dot display provided by the present invention and corresponds pixel units to shutter units. The electro-fluidic shutter uses an electro-fluidic phenomenon. When voltages are applied, a conductive fluid presses a non-conductive colored fluid to move to an edge of the shutter unit under an action of an electric field, and forces the non-conductive colored fluid to occupy only a small portion of a display region. Light emitted by a color conversion layer can pass through the electro-fluidic shutter with high transmittance. In a non-pressurized state, the non-conductive colored fluid spreads on a surface of a dielectric layer, absorbs ambient light outside the display device, and weakens a dark state light leakage phenomenon of the quantum dot display device. Contrast of the quantum dot display device under strong ambient light is improved, which is beneficial to application in outdoor advertising displays and the like.

DESCRIPTION OF SPECIFIC EMBODIMENTS OF THE INVENTION

The concept, specific structure, and technical effects of the present invention will be described clearly and completely in conjunction with embodiments and accompanying drawings in order to fully understand purposes, features, and effects of the present invention. Obviously, the described embodiments are only a part of examples of the present invention. Based on the embodiments of the present invention, other embodiments obtained by those skilled in the art without paying any creative work shall fall within protection scope of the present invention. Some explanations and specific embodiments are given below.

1. Relevant Explanation

Electro-fluidic displays (EFDs) are display technologies that control movement of an enclosed liquid by controlling voltages, which causes brightness of pixel regions to change.

In addition, for clarity, drawings schematically show width, size, thickness, shape, etc. compared with actual embodiments. However, these are just examples. Further, although the drawings appropriately omit parts unnecessary for explaining effects of the present invention, omissions do not limit scopes of the present invention. Furthermore, in order to make the drawings concise and easy to understand, in some drawings, components having same structures or functions are only schematically shown, or only one of them is shown.

2. Exemplary Embodiment

Figure 1:
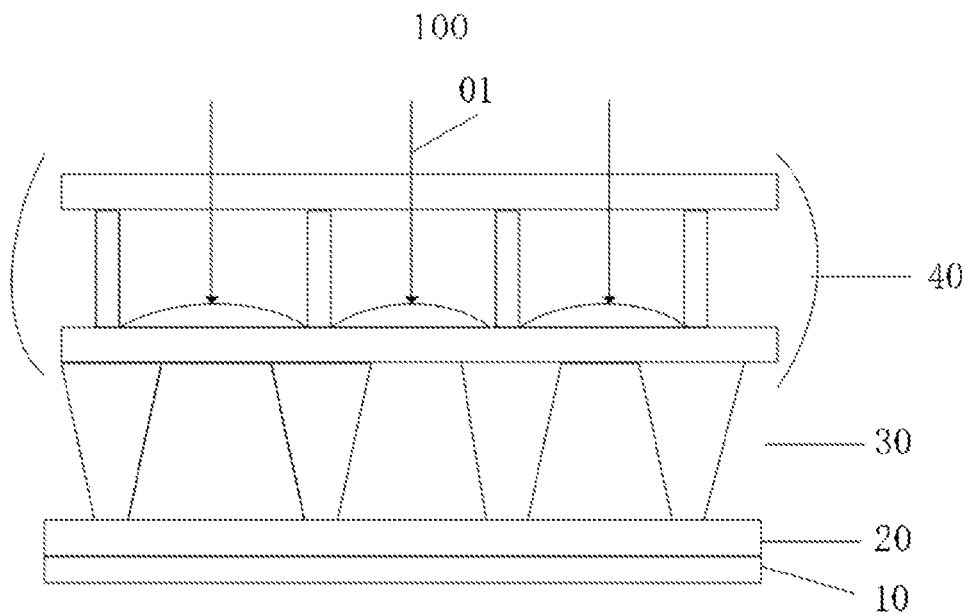
FIG. 1 is a schematic structural view showing a quantum dot display device in a dark state according to an embodiment of the present invention.
Figure 2:
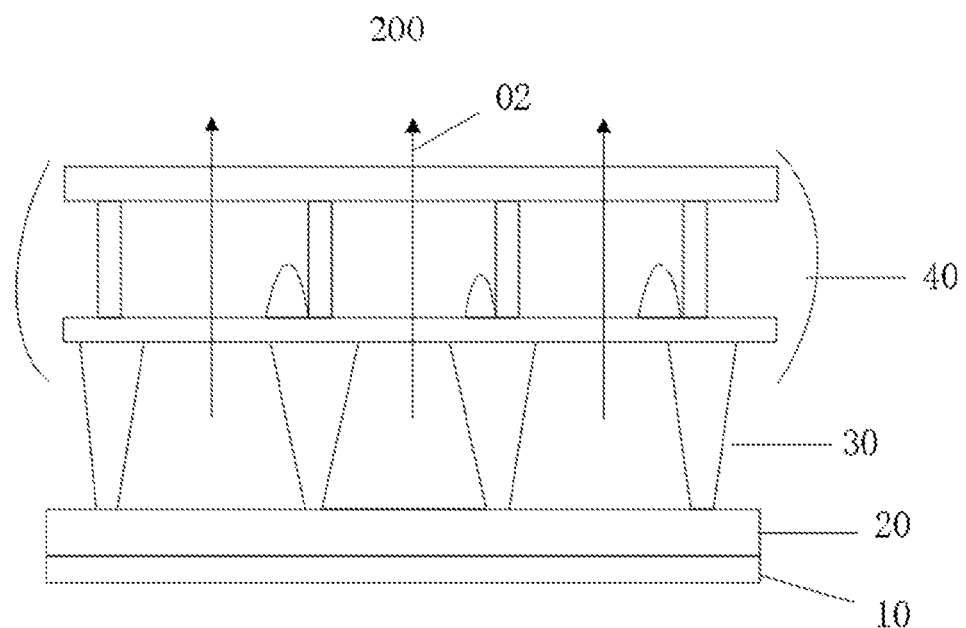
FIG. 2 is a schematic structural view showing the quantum dot display device in a bright state according to the embodiment of the present invention.

FIG. 1 is a schematic structural view showing a quantum dot display device in a dark state according to an embodiment of the present invention. FIG. 2 is a schematic structural view showing the quantum dot display device in a bright state according to the embodiment of the present invention. Refer to FIG. 1 and FIG. 2, a quantum dot display device 100 of the present invention comprises a base substrate 10; a backlight 20 disposed on a side of the base substrate 10; a color conversion layer 30 disposed on a side of the backlight 20 away from the base substrate 10, wherein the color conversion layer 30 can emit light under excitation of light of a predetermined wavelength range or can emit light under excitation of the backlight 20; and an electro-fluidic shutter 40 formed on a display surface of the quantum dot display device and disposed on a side of the color conversion layer 30 away from the backlight 20.

Figure 3:
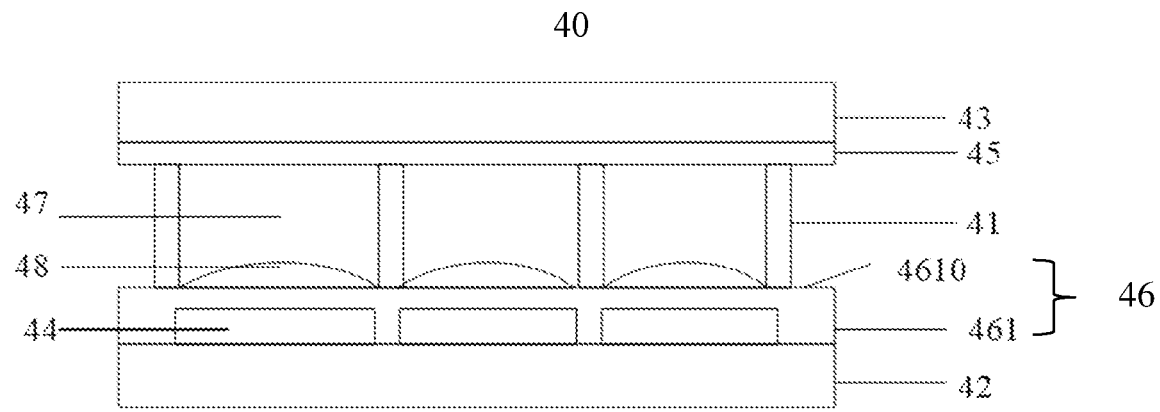
FIG. 3 is a schematic structural view showing an electro-fluidic shutter according to the embodiment of the present invention.

FIG. 3 is a schematic structural view showing an electro-fluidic shutter 40 according to the embodiment of the present invention. Refer to FIG. 3, the electro-fluidic shutter 40 comprises a plurality of shutter units, and a sealing portion 41 is disposed between adjacent shutter units. The sealing portion 41 may be composed of commonly used positive photoresist, negative photoresist, etc. The color conversion layer 30 comprises a plurality of pixel units, and the shutter units and the pixel units are disposed corresponding to each other in a one-to-one manner. Each of the shutter units comprises a first substrate 42, a second substrate 43 disposed opposite to the first substrate 42, a first electrode 44 disposed on the first substrate 42, a second electrode 45 disposed on the second substrate 43 and opposite to the first electrode 44, a dielectric layer 46 disposed on a side of the first electrode 44 away from the first substrate 42, and a conductive fluid 47 and a non-conductive fluid 48 filled between the first substrate 42 and the second substrate 43. The conductive fluid 47 and the non-conductive fluid 48 are immiscible with each other. The conductive fluid 47 has light transmittance, and the non-conductive fluid 48 has light absorption. Ambient light 01 and light 02 emitted by the color conversion layer 30 enter the electro-fluidic shutter 40 from both sides of the display surface. The electro-fluidic shutter 40 allows light to pass through when a voltage is applied, and blocks the light from being transmitted when the voltage is not applied.

The first electrode 44 and the second electrode 45 are ITO transparent conductive layers. The conductive fluid 47 is distilled water or an aqueous solution with an electrolyte. The non-conductive fluid 48 is a black organic solution. The dielectric layer 46 comprises a hydrophobic dielectric layer 461. The hydrophobic dielectric layer 461 is disposed on a side of the first electrode 44 away from the first substrate 42. The hydrophobic dielectric layer 461 comprises a hydrophobic surface 4610, and the hydrophobic surface 4610 is disposed on a side of the hydrophobic dielectric layer 461 away from the first electrode 44. In the exemplary embodiment, the black organic solution may be a solution in which a carbon alkane having 10 to 16 carbon atoms is used as a solvent to dissolve a black non-polar dye. In an embodiment, the conductive fluid 47 is distilled water, and the non-conductive fluid 48 is black ink. When the voltage is applied to an electrode pair, the wettability of the distilled water on the hydrophobic surface 4610 is improved, and the black ink with an oil phase is squeezed to corners of the dielectric layer 46. The light 02 emitted by the color conversion layer 30 passes through the corresponding shutter units, and the quantum dot display device is in the bright state. When the voltage is removed, the black ink is tiled on the dielectric layer 46 of each shutter unit. The external ambient light 01 is absorbed by the black ink to prevent the external ambient light 01 from exciting the color conversion layer 30, to weaken light leakage of the quantum dot display device in the dark state, and to improve contrast of the quantum dot display device.

Figure 4:
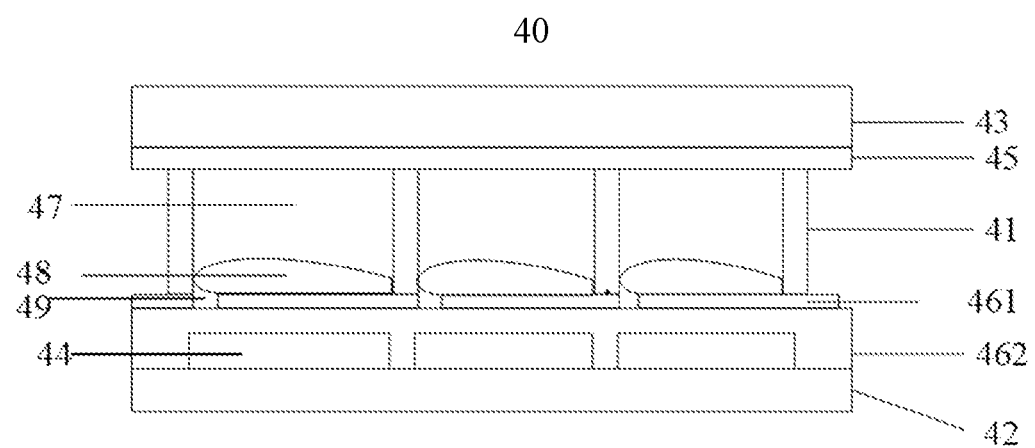
FIG. 4 is a schematic structural view showing the electro-fluidic shutter according to another embodiment of the present invention.
Figure 5:
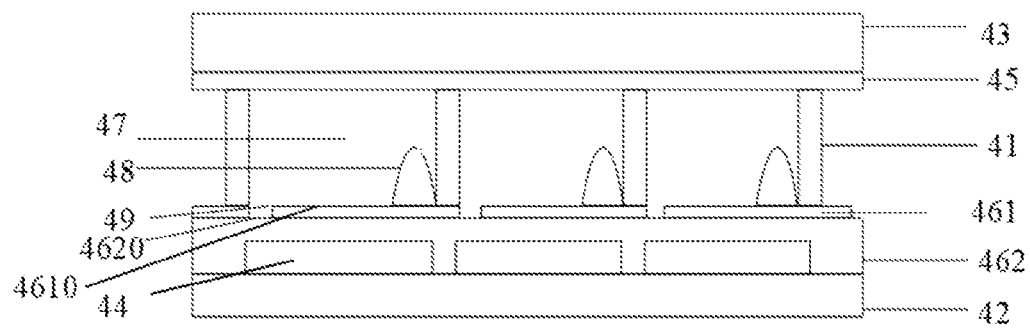
FIG. 5 is a schematic structural view showing the electro-fluidic shutter of FIG. 4 when voltages are applied.

FIG. 4 is a schematic structural view showing the electro-fluidic shutter according to another embodiment of the present invention. FIG. is a schematic structural view showing the electro-fluidic shutter of FIG. 4 with the voltage applied. Refer to FIG. 4 and FIG. 5, the dielectric layer 46 further comprises a hydrophilic dielectric layer 462. The hydrophilic dielectric layer 462 comprises a hydrophilic surface 4620. In an embodiment, the hydrophilic dielectric layer 462 is disposed between the hydrophobic dielectric layer 461 and the first electrode 44. A through hole 49 is defined at an edge of the hydrophobic dielectric layer 461 in the shutter unit, and the hydrophilic surface 4620 is exposed from the through hole 461. In another exemplary embodiment of the present invention, the hydrophilic dielectric layer 462 and the hydrophobic dielectric layer 461 are on a same layer. The hydrophilic dielectric layer 462 is disposed in a corner region of the second electrode 45 close to the sealing portion 41. The hydrophobic dielectric layer 461 is disposed on a remaining surface of the second electrode 45. Due to differences in wettability between the ink material and the hydrophobic surface 4610 and the hydrophilic surface 4620, a thickness of the black ink decreases from a side of the hydrophobic dielectric layer 461 to a side of the hydrophilic dielectric layer 462. After applying a voltage between the positive and negative electrode pairs, referring to FIG. 5, the black ink breaks at a thinnest thickness, and shrinks from the side of the hydrophilic dielectric layer 462 to the side of the hydrophobic dielectric layer 461, and eventually reaches a state of equilibrium that prevents the black ink from flowing back.

Figure 6:
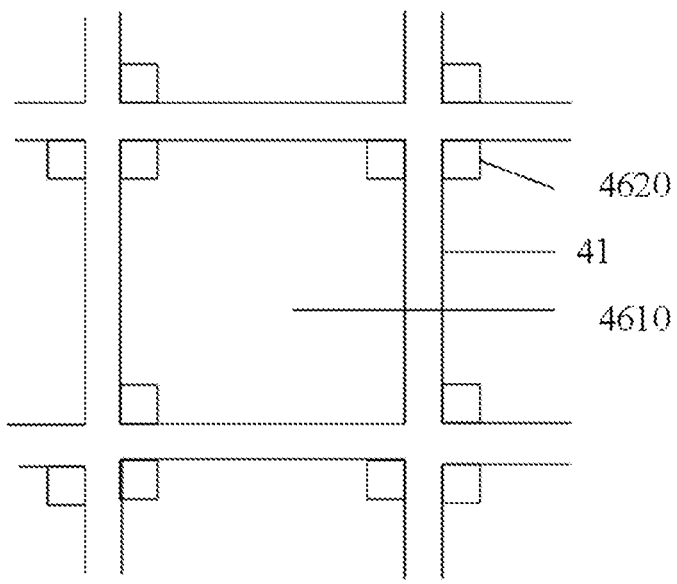
FIG. 6 is a schematic structural view showing shutter units of the electro-fluidic shutter in FIG. 5.

FIG. 6 is a schematic structural view showing shutter units of the electro-fluidic shutter in FIG. 4 (distilled water, black ink, electrodes, and substrate are not shown). As shown in FIG. 6, the first electrode 44 and the second electrode 45 have corresponding rectangular structures. A rectangular space is provided on three corners of an upper surface of the second electrode 45, and the rectangular space is provided with a hydrophilic dielectric layer 462 or a hydrophilic surface 4620 is exposed. In another embodiment, the rectangular structure may only be provided at two corners or one corner of the upper surface of the second electrode 45. In order to ensure that the ambient light 01 does not affect the color conversion layer 30, an area of the hydrophilic surface 4620 exposed in the shutter unit is no more than 5% of an area of the hydrophobic surface 4610 in the same shutter unit. In an embodiment, a material of the hydrophilic dielectric layer 462 is silicon dioxide or titanium dioxide, and a material of the hydrophobic dielectric layer 461 is a fluoropolymer material or a polyimide material.

Figure 7:
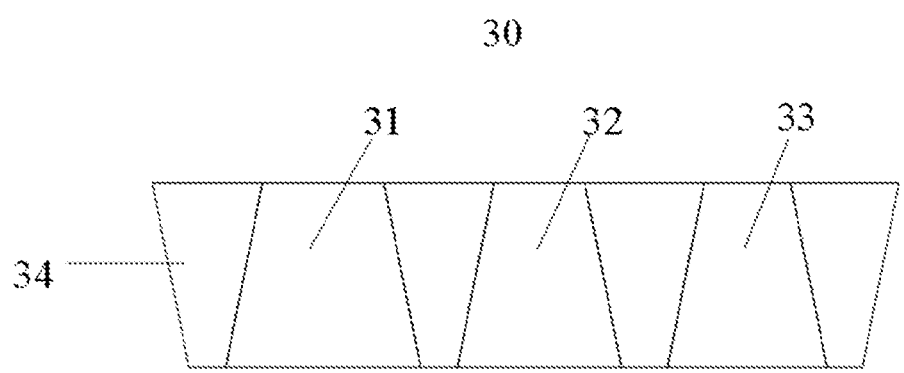
FIG. 7 is a schematic structural view showing a color conversion layer according to the embodiment of the present invention.

FIG. 7 is a schematic structural view showing a color conversion layer according to the embodiment of the present invention. Refer to FIG. 7, in an embodiment, the backlight 20 is a blue backlight, and the color conversion layer 30 comprises a plurality of pixel units. The pixel units comprise a red pixel unit 32, a green pixel unit 33, and a transparent pixel unit 31. A side of the red pixel unit 32, the green pixel unit 33, and the transparent pixel unit 31 away from the backlight 20 is correspondingly provided with the shutter units. The blue backlight is a blue light OLED or micro LED. The red pixel unit 32 comprises red quantum dot material. The green pixel unit 33 comprises green quantum dot material. The transparent pixel unit 31 does not comprise a quantum dot material, but is covered with a layer of transparent medium on a side of the backlight 20 away from the base substrate 10. The transparent medium layer may be a transparent resin layer, and a thickness of the transparent medium layer is the same as a thickness of the red pixel unit 32 and a thickness of the green pixel unit 33. In another embodiment, the transparent pixel unit 31 may be a light-transmitting hole. The light-transmitting hole is a hollow structure passing through the color conversion layer 30 for transmitting a blue light of the backlight 20. It should be noted that the present exemplary embodiment is not limited to a combination of the blue backlight with the red quantum dot material and the green quantum dot material. The color conversion layer 30 and the backlight 20 can display red, green, blue and other colors, to achieve a purpose of color display, and other is not as a limitation. The plurality of pixel units in the color conversion layer 30 has a variety of arrangements, depending on requirements. In an arrangement shown in FIG. 7, the transparent pixel unit 31, the red pixel unit 32, and the green pixel unit 33 in the color conversion layer 30 are sequentially arranged in a horizontal direction.

Another exemplary embodiment of the present invention further provides a manufacturing method of the quantum dot display device, and comprises steps of forming the electro-fluidic shutter 40 and forming the color conversion layer 30. Steps of forming the electro-fluidic shutter specifically comprise: providing a first substrate 42; forming a first electrode 44 on the first substrate 42; forming a dielectric layer 46 on the first electrode 44, wherein in an embodiment, the dielectric layer 46 may be a hydrophobic dielectric layer 461, and in another embodiment, the dielectric layer 46 comprises the hydrophobic dielectric layer 461 and a hydrophilic dielectric layer 462, wherein the hydrophilic dielectric layer 462 is covered on the first electrode 44, and the hydrophobic dielectric layer 461 is deposited on the hydrophilic dielectric layer 462, wherein a portion of the hydrophobic dielectric layer 461 is etched through a patterned dry etching process to form a through hole 49 to expose a portion of the hydrophilic dielectric layer 462, and the etched pattern can be any pattern, wherein in the exemplary embodiment, the exposed portion of the hydrophilic dielectric layer 462 has a rectangular shape, and the dry etching process comprises sputtering etching, reactive ion etching, and high-density plasma etching processes; forming a sealing portion 41 on the dielectric layer 46 to form a plurality of receiving portions; injecting a conductive fluid 47 and a non-conductive fluid 48 in each of the receiving portions; providing a second substrate 43 and depositing a second electrode 45 on the second substrate 43; sealing the receiving portion with the second substrate 43 on which the second electrode 45 is deposited to form a shutter unit and the electro-fluidic shutter. Steps of forming the color conversion layer 30 comprises: forming a color film layer; performing photoresist coating, exposure, development, etching, and photoresist isolation on the color film layer to form a plurality of first-type holes, a plurality of second-type holes, and a plurality of third-type holes; forming the red pixel unit 32 in the first-type hole, forming the green pixel unit 33 in the second-type hole, and forming the transparent pixel unit 31 in the third-type hole. A bank 34 is formed between the red pixel unit 32 and the green pixel unit 33. The transparent pixel unit 31, the red pixel unit 32, the green pixel unit 33, and the bank 34 constitute the color conversion layer 30. The formed electro-fluidic shutter 40 and the color conversion layer 30 are bonded by optically clear adhesive (OCA) according to the alignment method of the shutter unit and the pixel unit, and finally the backlight 20 and the base substrate 10 are bonded.

It should be noted that the above is only a preferred embodiment of the present invention. For those of ordinary skill in the art, without departing from the principle of non-application, multiple improvements and retouches can also be made. These improvements and retouches should also be regarded as the scope of protection of the present invention.

What is claimed is:

1. A quantum dot display device, comprising:
a base substrate;
a backlight disposed on a side of the base substrate;
a color conversion layer disposed on a side of the backlight away from the base substrate; and
an electro-fluidic shutter disposed on a side of the color conversion layer away from the backlight, wherein the electro-fluidic shutter comprises a plurality of shutter units, and a sealing portion is disposed between adjacent shutter units, each of the shutter units comprises a first substrate disposed on a side of the color conversion layer away from the backlight, a second substrate disposed opposite to the first substrate, a first electrode disposed on the first substrate, a second electrode disposed on the second substrate and opposite to the first electrode, a dielectric layer disposed on a side of the first electrode away from the first substrate, and a conductive fluid and a non-conductive fluid filled between the first substrate and the second substrate, wherein the conductive fluid and the non-conductive fluid are immiscible with each other, the conductive fluid has light transmittance, and the non-conductive fluid has light absorption.

2. The quantum dot display device as claimed in claim 1, wherein the conductive fluid is pure water or an aqueous solution with an electrolyte, and the non-conductive fluid is a black organic solution.

3. The quantum dot display device as claimed in claim 1, wherein the dielectric layer comprises a hydrophobic dielectric layer, the hydrophobic dielectric layer is disposed on the side of the first electrode away from the first substrate, the hydrophobic dielectric layer comprises a hydrophobic surface, and the hydrophobic surface is disposed on a side of the hydrophobic dielectric layer away from the first electrode.

4. The quantum dot display device as claimed in claim 3, wherein the dielectric layer further comprises a hydrophilic dielectric layer, the hydrophilic dielectric layer comprises a hydrophilic surface, the hydrophilic surface is disposed on a side of the hydrophilic dielectric layer away from the first electrode, and an area of the hydrophilic surface exposed in a same shutter unit is no more than 5% of an area of the hydrophobic surface.

5. The quantum dot display device as claimed in claim 4, wherein the hydrophilic dielectric layer is disposed between the hydrophobic dielectric layer and the first electrode, a through hole is defined at an edge of the hydrophobic dielectric layer in the shutter unit, and the hydrophilic surface is exposed from the through hole.

6. The quantum dot display device as claimed in claim 4, wherein the hydrophobic dielectric layer and the hydrophilic dielectric layer are on a same layer and are disposed on the side of the first electrode away from the first substrate, the hydrophilic dielectric layer is disposed close to a corner region of the sealing portion, and the hydrophobic surface and the hydrophilic surface together cover a side surface of the first electrode.

7. The quantum dot display device as claimed in claim 1, wherein the color conversion layer comprises a plurality of pixel units, and the shutter units and the pixel units are disposed corresponding to each other in a one-to-one manner.

8. The quantum dot display device as claimed in claim 7, wherein the backlight is a blue backlight, the pixel units comprise a red pixel unit, a green pixel unit, and a transparent pixel unit, the red pixel unit comprises red quantum dot material, the green pixel unit comprises green quantum dot material, and the shutter unit is disposed on a side of the red pixel unit and the green pixel unit away from the backlight.

9. A manufacturing method of a quantum dot display device, comprising following steps:
forming an electro-fluidic shutter, wherein steps of forming the electro-fluidic shutter comprise:
providing a first substrate;
forming a first electrode on the first substrate;
forming a dielectric layer on the first electrode;
forming a sealing portion on the dielectric layer to form a plurality of receiving portions;
injecting a conductive fluid and a non-conductive fluid in each of the receiving portions, wherein the conductive fluid and the non-conductive fluid are immiscible with each other, the conductive fluid has light transmittance, and the non-conductive fluid has light absorption;
providing a second substrate and depositing a second electrode on the second substrate;
sealing the receiving portions with the second substrate on which the second electrode is deposited; and
providing a base substrate, wherein a backlight is disposed on the base substrate, a color conversion layer is formed on a side of the backlight away from the base substrate, and the first substrate of the electro-fluidic shutter is attached to a side of the color conversion layer away from the backlight.

10. The manufacturing method as claimed in claim 9, wherein the conductive fluid is pure water or an aqueous solution with an electrolyte, and the non-conductive fluid is a black organic solution.

11. The manufacturing method as claimed in claim 9, wherein the dielectric layer comprises a hydrophobic dielectric layer, the hydrophobic dielectric layer is disposed on a side of the first electrode away from the first substrate, the hydrophobic dielectric layer comprises a hydrophobic surface, and the hydrophobic surface is disposed on a side of the hydrophobic dielectric layer away from the first electrode.

12. The manufacturing method as claimed in claim 11, wherein the dielectric layer further comprises a hydrophilic dielectric layer, the hydrophilic dielectric layer comprises a hydrophilic surface, the hydrophilic surface is disposed on a side of the hydrophilic dielectric layer away from the first electrode, and an area of the hydrophilic surface exposed in a same shutter unit is no more than 5% of an area of the hydrophobic surface.

13. The manufacturing method as claimed in claim 12, wherein the hydrophilic dielectric layer is disposed between the hydrophobic dielectric layer and the first electrode, a through hole is defined at an edge of the hydrophobic dielectric layer in the shutter unit, and the hydrophilic surface is exposed from the through hole.

14. The manufacturing method as claimed in claim 12, wherein the hydrophobic dielectric layer and the hydrophilic dielectric layer are on a same layer and are disposed on the side of the first electrode away from the first substrate, the hydrophilic dielectric layer is disposed close to a corner region of the sealing portion, and the hydrophobic surface and the hydrophilic surface together cover a side surface of the first electrode.

15. The manufacturing method as claimed in claim 9, wherein the color conversion layer comprises a plurality of pixel units, and the shutter units and the pixel units are disposed corresponding to each other in a one-to-one manner.

16. The manufacturing method as claimed in claim 15, wherein the backlight is a blue backlight, the pixel units comprise a red pixel unit, a green pixel unit, and a transparent pixel unit, the red pixel unit comprises red quantum dot material, the green pixel unit comprises green quantum dot material, and the shutter unit is disposed on a side of the red pixel unit and the green pixel unit away from the backlight.

17. The manufacturing method as claimed in claim 9, wherein the color conversion layer comprises a plurality of pixel units, a bank portion is disposed between adjacent pixel units, and the bank portion and the sealing portion are disposed corresponding to each other.

* * * * *